(12) United States Patent
Tanigawa et al.

(10) Patent No.: US 7,052,316 B2
(45) Date of Patent: May 30, 2006

(54) CARD CONNECTOR ASSEMBLY

(75) Inventors: Junichi Tanigawa, Kanagawa (JP); Doron Lapidot, Tokyo (JP); Masayuki Aizawa, Tokyo (JP); Tomoo Yamada, Kanagawa (JP)

(73) Assignee: Tyco Electronics AMP K.K, Kanagawa-Ken (JP)

( * ) Notice: Subject to any disclaimer, the term of this patent is extended or adjusted under 35 U.S.C. 154(b) by 0 days.

(21) Appl. No.: 10/995,969

(22) Filed: Nov. 23, 2004

(65) Prior Publication Data
US 2005/0159023 A1    Jul. 21, 2005

(30) Foreign Application Priority Data
Nov. 28, 2003  (JP)  ............................. 2003-400032

(51) Int. Cl.
*H01R 13/60* (2006.01)

(52) U.S. Cl. .................................. 439/541.5; 439/159

(58) Field of Classification Search ........ 439/157–159, 439/541.5, 341
See application file for complete search history.

(56) References Cited

U.S. PATENT DOCUMENTS 5,775,923 A * 7/1998 Tomioka ...................... 439/79
6,283,786 B1 * 9/2001 Margulis et al. ............ 439/488
6,347,961 B1 * 2/2002 Zhu et al. ................... 439/607
6,554,641 B1 * 4/2003 Wu .......................... 439/541.5

FOREIGN PATENT DOCUMENTS

JP    08-264240    10/1996
JP    09-022762    1/1997

* cited by examiner

*Primary Examiner*—Truc Nguyen
(74) *Attorney, Agent, or Firm*—Barley Snyder LLC

(57) ABSTRACT

The present invention provides an inexpensive card connector assembly which is used for the connection with two cards having mutually different transmission speeds, which can maintain transmission characteristics, and which is therefore suitable for high-speed transmission. The card connector assembly comprises first and second card connectors that are stacked for the connection with two cards having mutually different transmission speeds, and transmission paths for connecting the first and second card connectors to a circuit board. The transmission paths comprise a plurality of first and second terminal parts that respectively extend from the first and second card connectors, and a rigid board to which the first and second terminal parts are connected. The first terminal parts which extend from the first card connector that is to be connected to a card with a relatively high transmission speed are such that a large portion of each adjacent first terminal part from the first card connector to the rigid board extends parallel in a single row.

7 Claims, 13 Drawing Sheets

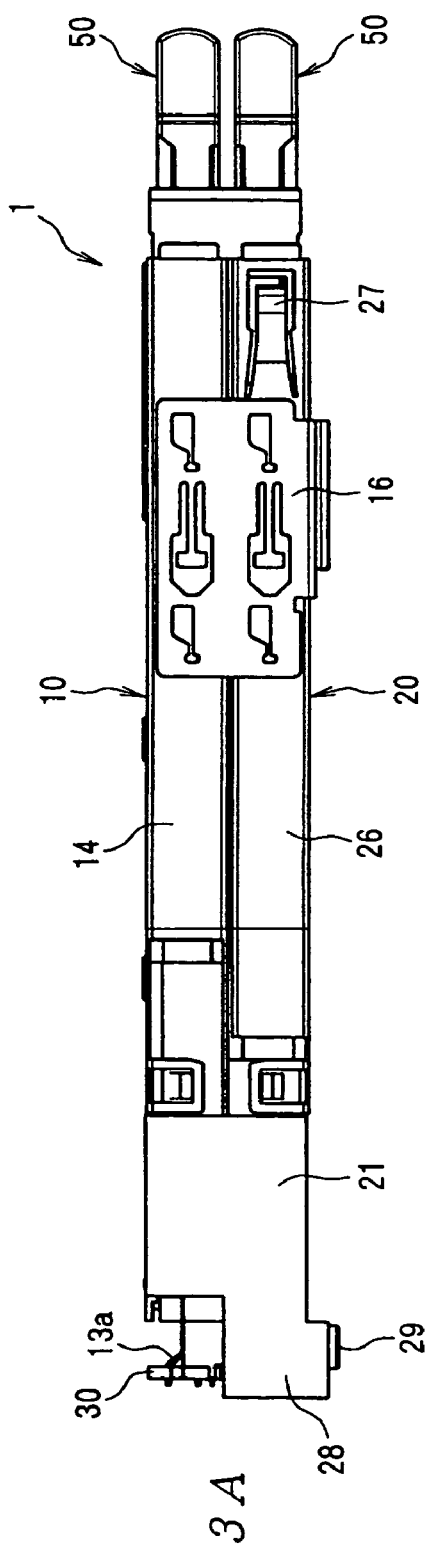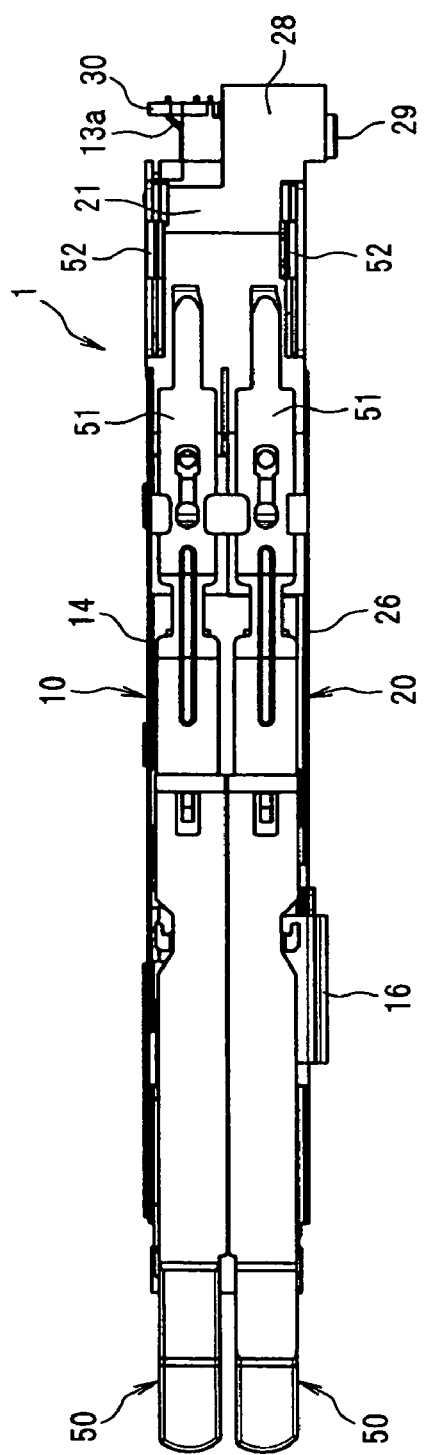
FIG. 3A
FIG. 3B

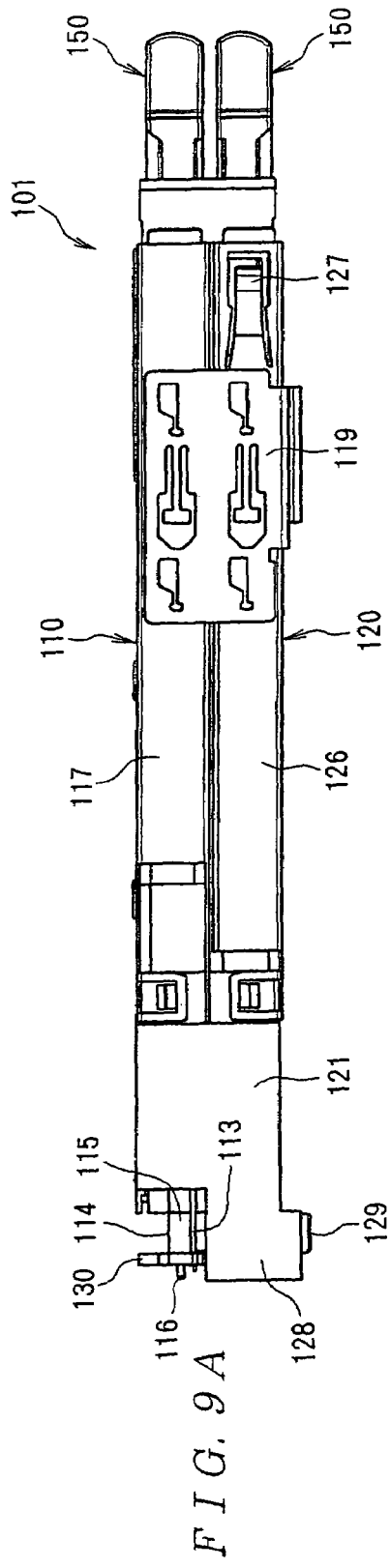
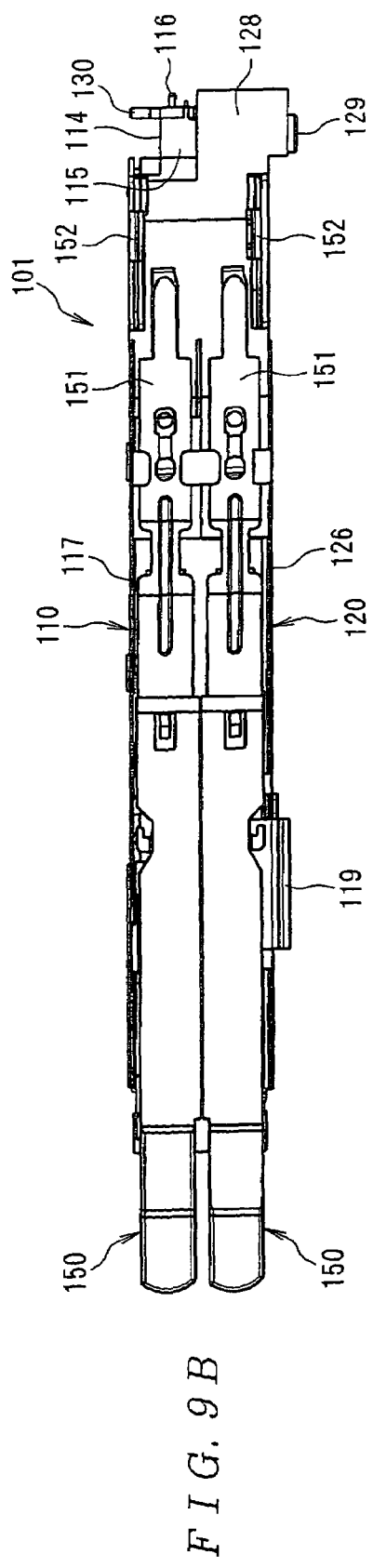
FIG. 9A
FIG. 9B

US 7,052,316 B2

CARD CONNECTOR ASSEMBLY

FIELD OF THE INVENTION

The present invention relates to a card connector assembly comprising a first card connector and a second card connector that are stacked for connection with two cards having mutually different transmission speeds.

BACKGROUND

A conventional card connector assembly is shown in FIGS. 12A and 12B (see Japanese Patent Application No. 9-22762). In this card connector assembly, two stacked card connectors (first and second card connectors) receive PCMCIA standard PC cards.

Here, the card connector assembly 200 shown in FIG. 12A is constructed by vertically stacking two card connectors that receive PC cards C, i.e., a first card connector 201 and a second card connector 210.

The first card connector 201 is constructed by disposing contacts 203 that contact a PC card C in two rows (upper and lower rows) in the upper portion of a housing 202. A ground member 205 that contacts the ground part of the PC card C that is received in the first card connector 201 is formed on the top surface of the housing 202 of the first card connector 201.

Furthermore, the second card connector 210 is constructed by disposing contacts 211 that contact a PC card (not shown) in two rows (upper and lower rows) in the lower portion of the housing 202. A ground member 213 that contacts the ground part of the PC card that is received in the second card connector 210 is formed in the portion of the housing 202 that is lower than the first card connector 201.

The first card connector 201 and second card connector 210 are placed on a common circuit board (not shown in the figure). The contacts 203 and ground member 205 of the first card connector 201 are connected to the circuit board by connection parts 204 of the contacts 203 that extend forward (toward the right in FIG. 12A) from the housing 202, connection parts 206 of the ground member 205, a relay board 207 that is connected to these connection parts 204 and 206, and a relay connector 220 that connects the relay board 207 to the circuit board. Furthermore, the contacts 211 and ground member 213 of the second card connector 210 are connected to the circuit board by connection parts 212 of the contacts 211 that extend forward from the housing 202, connection parts 214 of the ground member 213, a relay board 215 that is connected to these connection parts 212 and 214, and the relay connector 220 that connects the relay board 215 to the circuit board.

Moreover, the card connector assembly 230 shown in FIG. 12B is a modified example of the card connector assembly 200 shown in FIG. 12A, and is constructed by vertically stacking two card connectors (a first card connector 231 and a second card connector 240) that receive PC cards C.

The first card connector 231 is constructed by disposing contacts 233 that contact a PC card C in two rows (upper and lower rows) in the upper portion of the housing 232. A ground member 235 that contacts the ground part of the PC card C that is received in the first card connector 231 is formed on the top surface of the housing 232 of the first card connector 231. Furthermore, the second card connector 240 is constructed by disposing contacts 241 that contact a PC card (not shown) in two rows (upper and lower rows) in the lower portion of the housing 232. A ground member 243 that contacts the ground part of the PC card that is received in the second card connector 240 is formed in the portion of the housing 232 that is lower than the first card connector 231.

The first card connector 231 and second card connector 240 are placed on a common circuit board (not shown in the figure). The contacts 233 and ground member 235 of the first card connector 231, and the contacts 241 and ground member 243 of the second card connector 240, are connected to the circuit board by connection parts 234, 236, 242 and 244 that extend from the housing 232, a single relay board 237 that is connected to these connection parts 234, 236, 242 and 244, and a relay connector 250 that connects the relay board 237 to the circuit board.

Furthermore, the card connector assembly shown in FIG. 13 (see Japanese Patent Application No. 8-264240), is another example of a card connector assembly in which two card connectors (first and second card connectors) that receive PCMCIA standard PC cards are stacked.

The card connector assembly 300 shown in FIG. 13 is constructed by vertically stacking two card connectors (a first card connector 301 and a second card connector 310) that receive PC cards (not shown in the figure).

In the first card connector 301, contacts that contact a PC card are provided in two rows (upper and lower rows) on the front wall surface (right wall surface in FIG. 13) of a housing 302, and connection parts 303 of the contacts are formed to protrude forward from this front wall surface. A ground member that contacts the ground part of the PC card received in the first card connector 301 is provided in the upper portion of the front wall surface of the housing 302 of the first card connector 301, and connection parts 304 of the ground member are formed to protrude forward from this front wall surface. Furthermore, in the second card connector 310, contacts that contact a PC card are provided in two rows (upper and lower rows) on the front wall surface (right wall surface in FIG. 13) of a housing 311, and connection parts 312 of the contacts are formed to protrude forward from this front wall surface. A ground member that contacts the ground part of the PC card received in the second card connector 310 is provided in the upper portion of the front wall surface of the housing 311 of the second card connector 310, and connection parts 313 of the ground member are formed to protrude forward from this front wall surface.

The first card connector 301 and second card connector 310 are placed on a common circuit board 330. The contacts and ground member of the first card connector 301, and the contacts and ground member of the second card connector 310, are connected to the circuit board 330 by the connection parts 303, 304, 312 and 313 that extend from the respective front wall surfaces of the housings 302 and 311, a flexible circuit board (hereafter referred to simply as "FPC") 305 that is connected to these connection parts 303, 304, 312 and 313, and a relay connector 320 that connects the FPC 305 to the circuit board 330.

Meanwhile, as a result of the spread of portable-type personal computers in recent years, there has been an increasing demand not only for such card connector assemblies that receive PCMCIA standard PC cards, but also for a card connector assembly comprising a first card connector and a second card connector that are stacked for the connection with two cards such as memory cards that have mutually different transmission speeds. An example is a card connector assembly comprising a connector that is connected to a memory card with a relatively high transmission speed (approximately 3 GHz) as the first card connector, and a connector that is connected to a PCMCIA standard PC card with a relatively low transmission speed as the second card connector.

The following problems have been encountered when an attempt is made to use the card connector assemblies 200 and 230 shown in FIGS. 12A and 12B or the card connector assembly 300 shown in FIG. 13 to connect with cards having mutually different transmission speeds.

Specifically, in the case of the card connector assembly 200 shown in FIG. 12A, the signal transmission path between the first card connector 201 and the relay connector 220 is constructed from the connection parts 204 of the two rows (upper and lower rows) of the contacts 203, and the relay board 207 that is connected to these connection parts 204. Furthermore, the signal transmission path between the second card connector 210 and the relay connector 220 is constructed from the connection parts 212 of the two rows (upper and lower rows) of the contacts 211, and the relay board 215 that is connected to these connection parts 212. In these signal transmission paths, since the connection parts 204 of the contacts 203 and the connection parts 212 of the contacts 211 are each formed in two rows (upper and lower rows), in cases where a memory card having a high transmission speed of approximately 3 GHz is connected to one of the connectors 201 and 210, noise is produced between the connection parts 204 of the two rows (upper and lower rows) or between the connection parts 212 of the two rows (upper and lower rows), so that such a card connector assembly is not suitable for high-speed transmission. Moreover, in the card connector assembly 230 shown in FIG. 12B as well, since the connection parts 234 of the contacts 233 and the connection parts 242 of the contacts 241 are similarly each formed in two rows (upper and lower rows) in the signal transmission paths, in cases where a memory card having a high transmission speed of approximately 3 GHz is connected to one of the connectors 231 and 240, noise is introduced between the connection parts 234 of the two rows (upper and lower rows) or between the connection parts 242 of the two rows (upper and lower rows), so that such a card connector assembly is not suitable for high-speed transmission.

Meanwhile, in the card connector assembly 300 shown in FIG. 13, the signal transmission paths between the first and second card connectors 301 and 310 and the relay connector 320 are constructed from the connection parts 303 and 312 of the two rows (upper and lower rows) each, and the FPC 305 that is connected to these connection parts 303 and 312. In these signal transmission paths, the connection parts 303 and 312 are each formed in two rows (upper and lower rows), but the length of these parts is relatively short, while the FPC 305 is relatively long; accordingly, in cases where a memory card having a high transmission speed of approximately 3 GHz is connected to one of the connectors 301 and 310, noise introduced between the connection parts 303 of the two rows (upper and lower rows) or between the connection parts 312 of the two rows (upper and lower rows) is small, so that this card connector assembly can be used for high-speed transmission as well. However, there is a problem in that a relatively long FPC 305 is needed, so that the cost of the product becomes high.

SUMMARY

Accordingly, the present invention was devised in light of the problems described above; it is an object of the present invention to provide an inexpensive card connector assembly that is used to connect two cards having mutually different transmission speeds, that can maintain transmission characteristics, and that is therefore suitable for high-speed transmission.

In order to solve the problems described above, the present invention, provides, in an exemplary embodiment, a card connector assembly comprising: first and second card connectors that are stacked for the connection with two cards having mutually different transmission speeds; and transmission paths for connecting the first and second card connectors to a circuit board on which these first and second card connectors are to be placed, wherein these transmission paths comprise a plurality of first and second terminal parts that respectively extend from the first and second card connectors, and a rigid board to which these first and second terminal parts are connected, and the first terminal parts which extend from the first card connector that is to be connected to a card having a relatively high transmission speed are such that a large portion of each adjacent first terminal part from the first card connector to the rigid board extends parallel in a single row.

BRIEF DESCRIPTION OF THE DRAWINGS

FIGS. 3A and 3B show the card connector assembly shown in FIG. 1, with FIG. 3A being a left-side view, and FIG. 3B being a right-side view;

FIGS. 9A and 9B show the card connector assembly shown in FIG. 7, with FIG. 9A being a left-side view, and FIG. 9B being a right-side view;

DETAILED DESCRIPTION OF THE EMBODIMENT(S)

Next, embodiments of the present invention will be described with reference to the figures. The card connector assembly 1, as shown in FIGS. 1, 2, 3A and 3B, 4, and 5, is constructed by vertically stacking, in two tiers, a first card connector 10 for connecting a card (not shown in the figures) such as a memory card having a relatively high transmission speed, and a second card connector 20 for connecting a card (not shown in the figures) such as a PCMCIA standard PC card having a relatively low transmission speed.

Figure 4:
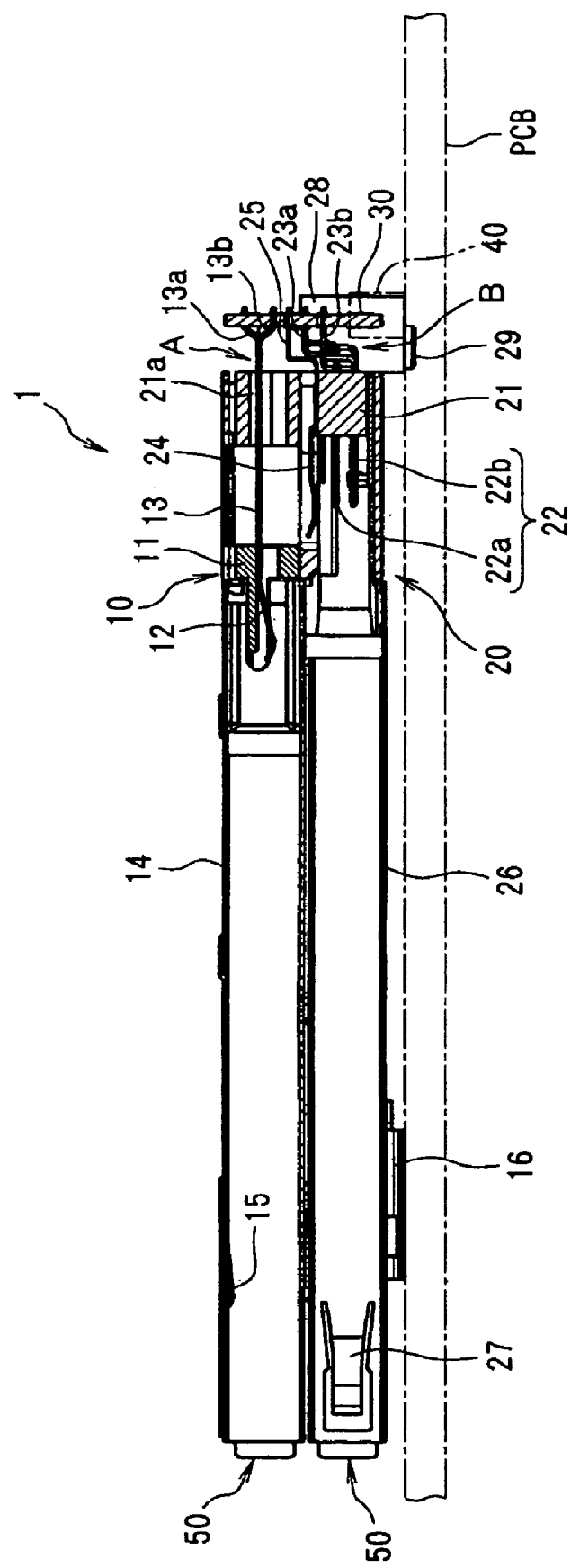
FIG. 4 is a sectional view along line 4—4 in FIG. 1 (in FIG. 4, the relay connector and circuit board are indicated with a one-dot chain line)

As is shown in FIG. 4, the first card connector 10 comprises a first housing 11 and a plurality of first contacts 12. The first housing 11 extends in the direction of width (in the left-right direction in FIG. 1), and is attached to a second housing 21 for the second card connector 20. The plurality of first contacts 12 contact the signal terminals of a card that is received in the first card connector 10. The first contacts 12 are press-fitted to the first housing 11 in a single row along the direction of width of the first housing 11. A metal shell 14 which extends rearward (downward in FIG. 1) from the portion where the first contacts 12 are secured, and which covers the entire card connector assembly 1, is attached to the top surface of the first housing 11. Ground contact tongue parts 15, which contact the ground part of a card that is received in the first card connector 10, are provided on the metal shell 14. These ground contact tongue parts 15 are grounded to the circuit board PCB (see FIG. 4) by means of metal brackets 16 disposed on the side portions of the card connector assembly 1.

Meanwhile, the second card connector 20 comprises a second housing 21 which extends in the direction of width (in the left-right direction in FIG. 1), and a plurality of second contacts 22 which contact the signal terminals of a card that is received in the second card connector 20. The second contacts 22 are press-fitted to the second housing 21 in two rows (upper and lower rows) along the direction of width of the second housing 21. A ground plate 24 which contacts the signal ground part of a card that is received in the second card connector 20 is attached to the second housing 21 in a position that is lower than the first card connector 10. Furthermore, a metal shell 26 which extends rearward (downward in FIG. 1) from the portion where the second contacts 22 are secured, and which covers the entire undersurface of the card connector assembly 1, is attached to the undersurface of the second housing 21. Ground contact tongue parts 27 which contact the frame ground part of a card that is received in the second card connector 20 are provided on the side walls of the metal shell 26. These ground contact tongue parts 27 are grounded to the circuit board PCB by means of metal brackets 16 disposed on the side parts of the card connector assembly 1.

So-called push-push-type ejection mechanisms 50 are respectively disposed on a side part of the first card connector 10 and of the second card connector 20, so that cards that are respectively received in the first card connector 10 and second card connector 20 can be ejected by these ejection mechanisms 50. Each ejection mechanism 50 comprises a push bar 51, a cam bar 52 that is pivoted by the push bar 51 to eject a card, a cam member 53 that has a heart-shaped cam groove, and a cam follower member 54 that has a cam follower for following the cam groove.

Furthermore, the first card connector 10 and second card connector 20 are placed on the common circuit board PCB as shown in FIG. 4. A pair of mounting parts 28 are provided on either end part in the direction of width of the second housing 21 in order to place these first and second card connectors 10 and 20 on the circuit board PCB, and a through-hole 28a used for an attachment screw is formed in each of the mounting parts 28. A positioning projection 29 with respect to the circuit board PCB is disposed on the bottom surface of each of the mounting parts 28.

In addition, the card connector assembly 1 is provided with a transmission path A for connecting the first contacts 12 of the first card connector 10 to the circuit board PCB, and a transmission path B for connecting the second contacts 22 and ground plate 24 of the second card connector 20 to the circuit board PCB.

Figure 5:
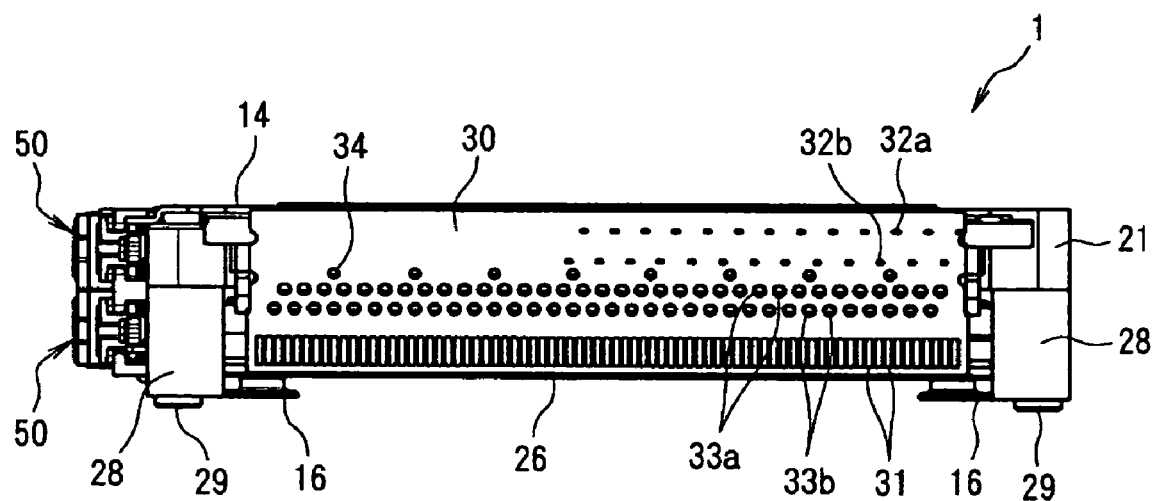
FIG. 5 is a back view of the card connector assembly shown in FIG. 1.

The transmission path A for connecting the first card connector 10 to the circuit board PCB comprises a plurality of first terminal parts 13 that extend to the front of the first housing 11 from the respective first contacts 12 of the first card connector 10, and a rigid board 30 to which the respective first terminal parts 13 are connected. Here, the plurality of first terminal parts 13 that extend to the front of the first housing 11 from the respective first contacts 12 are such that a large portion of each adjacent first terminal part 13 from the first housing 11 to the rigid board 30 (excluding the feet 13a and 13b that are connected to the rigid board 30) extends parallel in a single row. The respective first terminal parts 13 pass through a through-hole 21a formed in the second housing 21, and extend to the rigid board 30. The feet 13a and 13b of the first terminal parts 13 that are connected to the rigid board 30 are arranged in two rows (upper and lower rows) in an alternately staggered fashion along the direction of width of the rigid board 30. Furthermore, as is shown in FIG. 5, the feet 13a and 13b are respectively connected by soldering to through-holes 32a and 32b that are arranged in two rows (upper and lower rows) in an alternately staggered fashion along the direction of width of the rigid board 30. Thus, by disposing the feet 13a and 13b of the first terminals 13 in two rows (upper and lower rows) in an alternately staggered fashion along the direction of width of the rigid board 30, the pitch in the direction of width of the through-holes 32a and 32b formed in the rigid board 30 can be made small. Signal conductive patterns (not shown in the figures) are formed on the inner surface (left surface in FIG. 4) of the rigid board 30, so that the feet 13a and 13b of the first terminals 13 and these signal conductive patterns are electrically connected to each other when the feet 13a and 13b of the first terminals 13 are connected to the through-holes 32a and 32b.

Furthermore, the transmission path B for connecting the second card connector 20 to the circuit board PCB comprises a plurality of second terminal parts 23a that extend to the front of the second housing 21 from the respective second contacts 22a of the upper row, a plurality of second terminal parts 23b that extend to the front of the second housing 21 from the respective second contacts 22b of the lower row, a plurality of connection parts 25 that extend to the front of the second housing 21 from the ground plate 24, and the rigid board 30 to which the respective second terminal parts 23a and 23b and connection parts 25 are connected. Here, the respective second terminal parts 23a and 23b are arranged in two rows (upper and lower rows) along the direction of width of the rigid board 30, and are respectively connected by soldering to through-holes 33a and 33b that are arranged in two rows (upper and lower rows) in an alternately staggered fashion along the direction of width of the rigid board 30 as shown in FIG. 5. Thus, the pitch in the direction of width of the through-holes 33a and 33b formed in the rigid board 30 can be made small by arranging the through-holes 33a and 33b in two rows (upper and lower rows) in an alternately staggered fashion along the direction of width of the rigid board 30. Moreover, a plurality of through-holes 34 to which the connection parts 25 of the ground plate 24 are connected by soldering are formed in the rigid board 30. Furthermore, signal conductive patterns (not shown in the figures) that connect signal conductive pads 31 and the through-holes 33a and 33b, and ground conductive pattern (not shown in the figures) that connects ground conductive pads 31 and the through-holes 34, are formed on the outer surface of the rigid board 30. When the second terminal parts 23a and 23b are connected to the through-holes 33a and 33b, the second terminal parts 23a and 23b and these signal conductive patterns are electrically connected to each other. In addition, when the connection parts 25 of the ground plate 24 are connected to the through-holes 34, the connection parts 25 and this ground conductive pattern are electrically connected to each other.

Furthermore, the rigid board 30 mates with a relay connector 40 disposed on the circuit board PCB when the first card connector 10 and second card connector 20 are placed on the circuit board PCB. As a result, the first contacts 12 of the first card connector 10 and the circuit board PCB are electrically connected to each other, and the second contacts 22 and ground plate 24 of the second card connector 20 and the circuit board PCB are electrically connected to each other.

If a card that has a relatively high transmission speed is connected to the first card connector 10 in a state in which the first contacts 12 of the first card connector 10 and the circuit board PCB are electrically connected to each other, the signal terminals of the card are connected to the circuit board PCB via the first contacts 12, the first terminal parts 13, the rigid board 30, and the relay connector 40. Here, since the first terminal parts 13 are such that a large portion of each adjacent first terminal part 13 from the first housing 11 to the rigid board 30 extends parallel in a single row, noise introduced between adjacent first terminal parts 13 can be reduced without using an expensive FPC. Accordingly, it is possible to produce an inexpensive card connector assembly 1 that can maintain transmission characteristics and that is therefore suitable for high-speed transmission.

Furthermore, when a card that has a relatively high transmission speed is connected to the first card connector 10, the ground part of the card is grounded to the circuit board PCB via the ground contact tongue parts 15 and metal brackets 16.

On the other hand, if a card that has a relatively low transmission speed is connected to the second card connector 20 in a state in which the second contacts 22 and ground plate 24 of the second card connector 20 and the circuit board PCB are electrically connected to each other, the signal terminals of the card are connected to the circuit board PCB via the second contacts 22a and 22b, the second terminal parts 23a and 23b, the rigid board 30, and the relay connector 40. In this case, furthermore, the signal ground part of the card is grounded to the circuit board PCB via the ground plate 24, the rigid board 30, and the relay connector 40. Moreover, the frame ground part of the card is grounded to the circuit board PCB via the ground contact tongue parts 27 and metal brackets 16.

Figure 6:
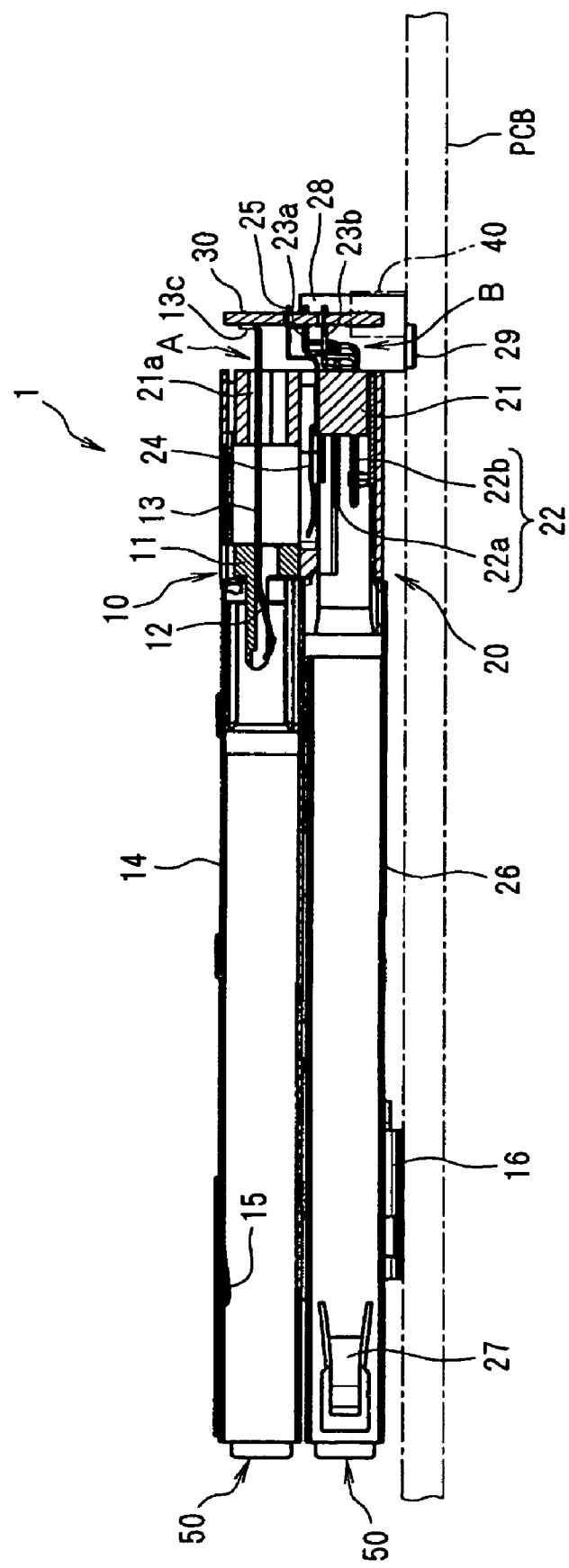
FIG. 6 is a sectional view approximately along line 4—4 in FIG. 1, with this view showing a card connector assembly according to an alternative exemplary embodiment of the present invention.
Figure 7:
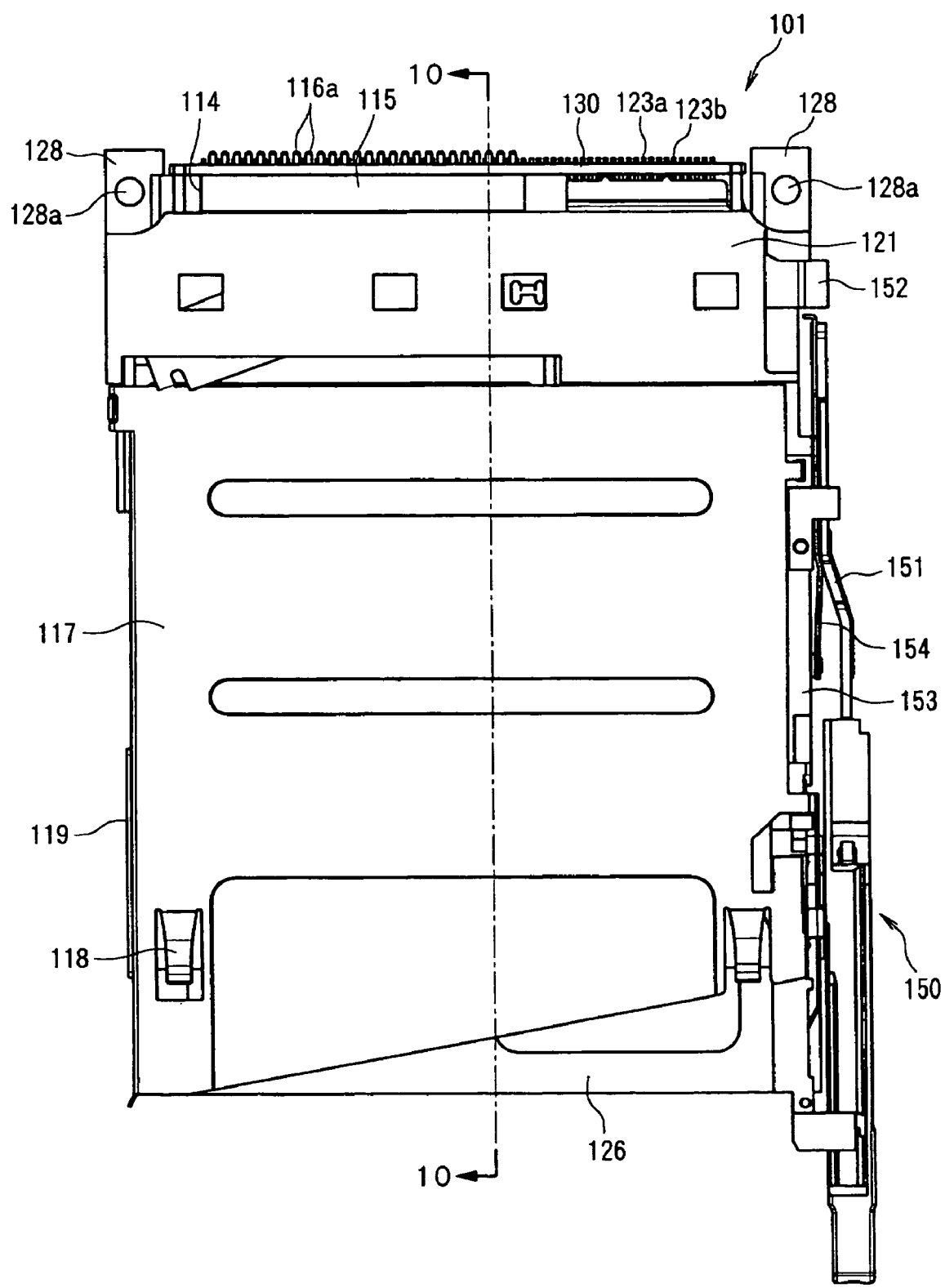
FIG. 7 is a plan view of a card connector assembly according to another alternative exemplary embodiment of the present invention.
Figure 8:
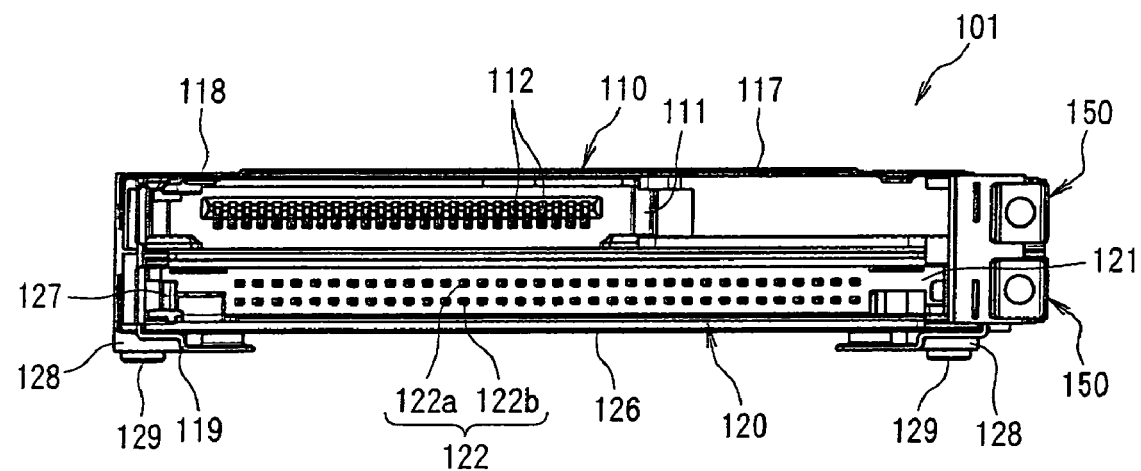
FIG. 8 is a front view of the card connector assembly shown in FIG. 7.

Next, a modified example of the card connector assembly 1 shown in FIG. 1 will be described with reference to FIG. 6. FIG. 6 is a sectional view along line 4—4 in FIG. 1, with this view showing a modified example of the card connector assembly shown in FIG. 1.

Figure 1:
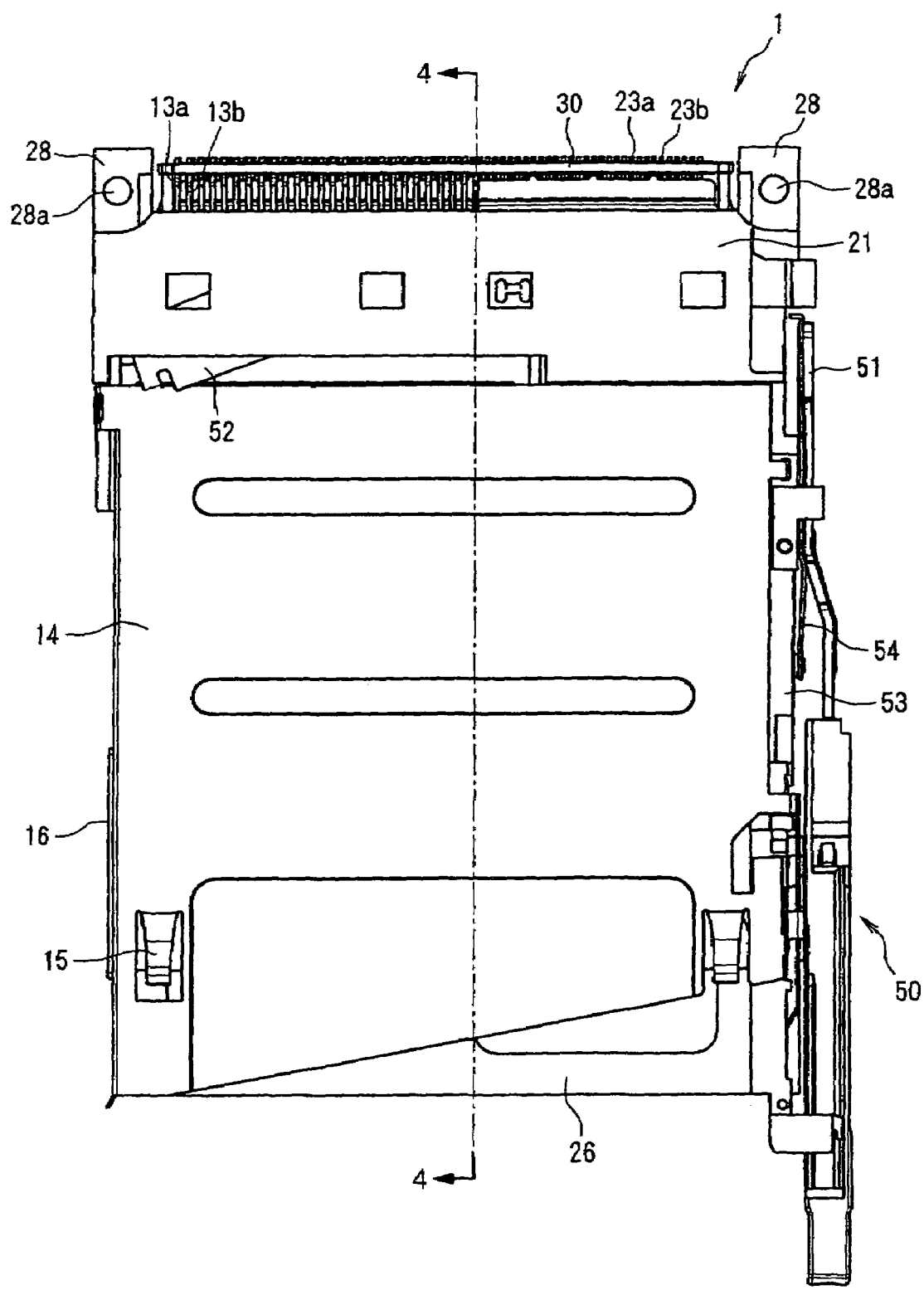
FIG. 1 is a plan view of a the card connector assembly according to an exemplary embodiment of the present invention.
Figure 2:
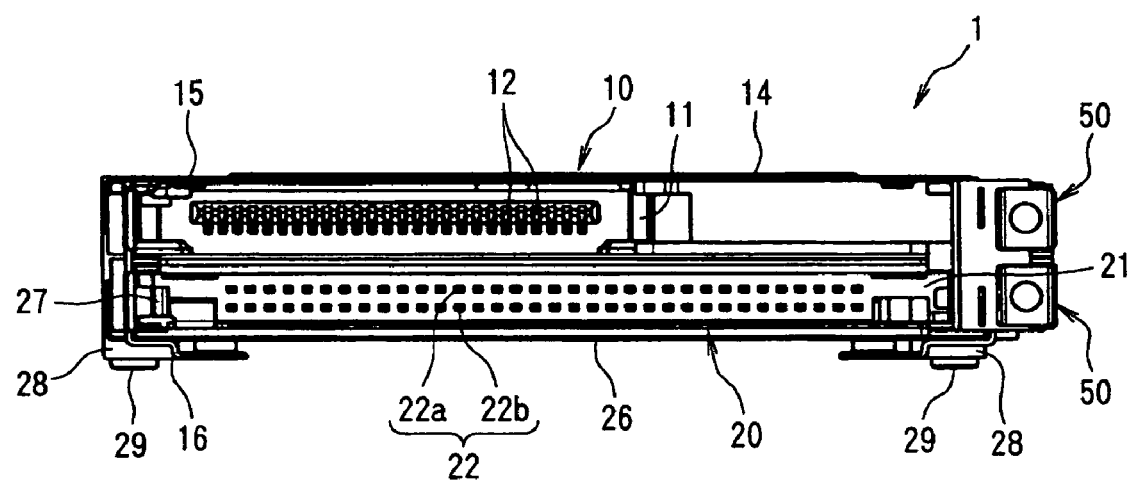
FIG. 2 is a front view of the card connector assembly shown in FIG. 1.

In FIG. 6, for those symbols that are the same as the symbols indicated in FIG. 1, a description has been omitted. Unlike the card connector assembly 1 shown in FIG. 1, the card connector assembly 1 shown in FIG. 6 is devised so that the respective feet 13c of the plurality of first terminal parts 13 that extend to the front of the first housing 11 from the first contacts 12 of the first card connector 10 are bent on the side of the inner surface of the rigid board 30 and connected to the inner surface of the rigid board 30 by surface-mounting. Consequently, there is no through-hole connection in the signal transmission path from the first card connector 10 to the relay connector 40 (to the circuit board PCB in cases where the relay connector 40 is a surface-mounting-type connector), so that a loss of signal transmission energy at the through-holes can be avoided, thus allowing a card connector assembly that is even more suitable for high-speed signal transmission to be produced. Furthermore, the first terminal parts 13 can be connected in a single row on the rigid board 30, so that noise introduced between adjacent first terminal parts 13 can be reduced, which makes it possible to produce a card connector assembly that is even more suitable for high-speed transmission. Moreover, since the feet 13c of the first terminal parts 13 are bent upward, touch-up (manual repair work of the solder connection parts) from the above is facilitated.

Next, a card connector assembly according to an alternative exemplary embodiment of the present invention will be described with reference to FIGS. 7, 8, 9A and 9B, 10, and 11. In this embodiment, the card connector assembly 101 is constructed by vertically stacking, in two tiers, a first card connector 110 for connecting a card (not shown in the figures) such as a memory card having a relatively high transmission speed, and a second card connector 120 for connecting a card (not shown in the figures) such as a PCMCIA standard PC card having a relatively low transmission speed.

Figure 10:
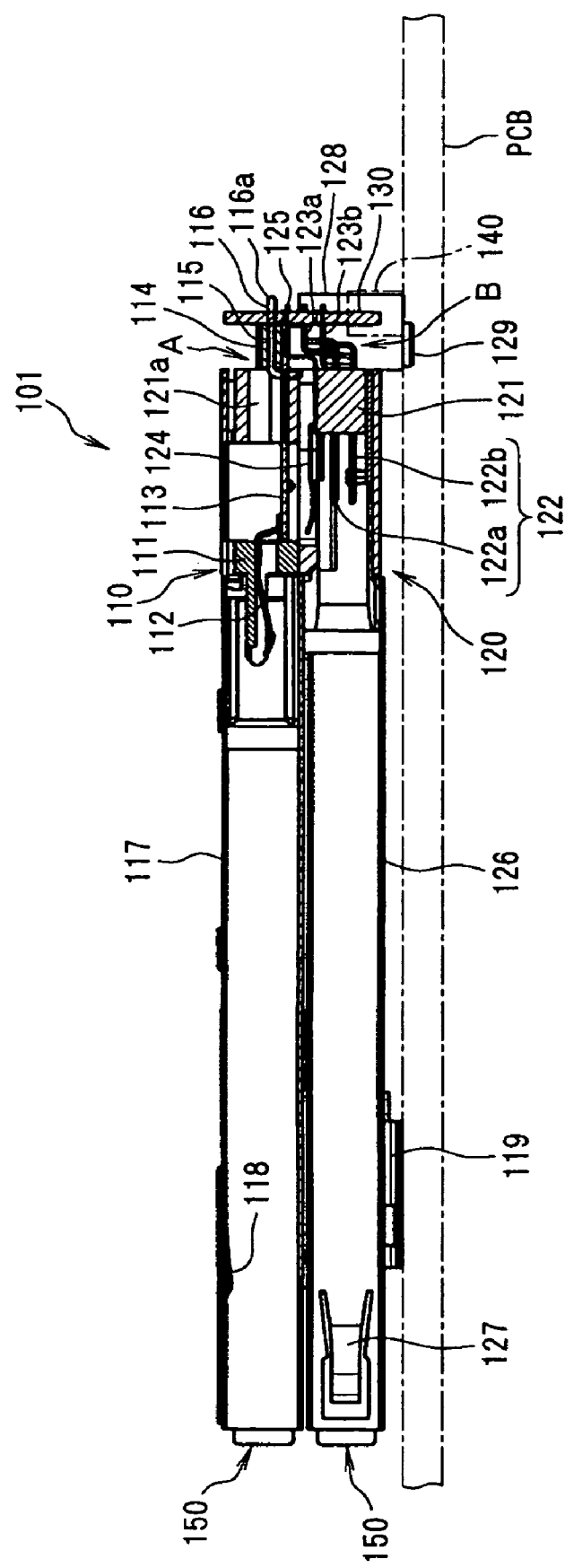
FIG. 10 is a sectional view along line 10—10 in FIG. 7 (in FIG. 10, the relay connector and circuit board are indicated with a one-dot chain line)

As is shown in FIG. 10, the first card connector 110 comprises a first housing 111, which extends in the direction of width (in the left-right direction in FIG. 7), and which is attached to a second housing 121 for the second card connector 120, and a plurality of first contacts 112 which contact the signal terminals of a card (not shown) that is received in the first card connector 110. The first contacts 112 are press-fitted to the first housing 111 in a single row along the direction of width of the first housing 111. A metal shell 117 which extends rearward (downward in FIG. 7) from the portion where the first contacts 112 are secured, and which covers the entire card connector assembly 101, is attached to the top surface of the first housing 111. Ground contact tongue parts 118 which contact the ground part of a card that is received in the first card connector 110 are provided on the metal shell 117. These ground contact tongue parts 118 are grounded to the circuit board PCB (see FIG. 10) by means of metal brackets 119 disposed on the side portions of the card connector assembly 101.

Meanwhile, the second card connector 120 comprises a second housing 121 which extends in the direction of width (in the left-right direction in FIG. 7), and a plurality of second contacts 122 which contact the signal terminals of a card that is received in the second card connector 120. The second contacts 122 are press-fitted to the second housing 121 in two rows (upper and lower rows) along the direction of width of the second housing 121. A ground plate 124 which contacts the signal ground part of a card that is received in the second card connector 120 is attached to the second housing 121 in a position that is lower than the first card connector 110. Furthermore, a metal shell 126 which extends rearward (downward in FIG. 7) from the portion where the second contacts 122 are secured, and which covers the entire undersurface of the card connector assembly 101, is attached to the undersurface of the second housing 121. Ground contact tongue parts 127 which contact the frame ground part of a card that is received in the second card connector 120 are provided on the side walls of the metal shell 126. These ground contact tongue parts 127 are grounded to the circuit board PCB by means of metal brackets 119 disposed on the side parts of the card connector assembly 101.

So-called push-push-type ejection mechanisms 150 are respectively disposed on a side part of the first card connector 110 and of the second card connector 120, so that cards that are respectively received in the first card connector 110 and second card connector 120 can be ejected by these ejection mechanisms 150. Each ejection mechanism 150 comprises a push bar 151, a cam bar 152 that is pivoted by the push bar 151 to eject a card, a cam member 153 that has a heart-shaped cam groove, and a cam follower member 154 that has a cam follower for following the cam groove.

Furthermore, the first card connector 110 and second card connector 120 are placed on the common circuit board PCB as shown in FIG. 10. A pair of mounting parts 128 are provided on either end part in the direction of width of the second housing 121 in order to place these first and second card connectors 110 and 120 on the circuit board PCB, and a through-hole 128a used for an attachment screw is formed in each of the mounting parts 128. A positioning projection 129 with respect to the circuit board PCB is disposed on the bottom surface of each of the mounting parts 128.

In addition, the card connector assembly 101 is provided with a transmission path A for connecting the first contacts 112 of the first card connector 110 to the circuit board PCB, and a transmission path B for connecting the second contacts 122 and ground plate 124 of the second card connector 120 to the circuit board PCB.

Figure 11:
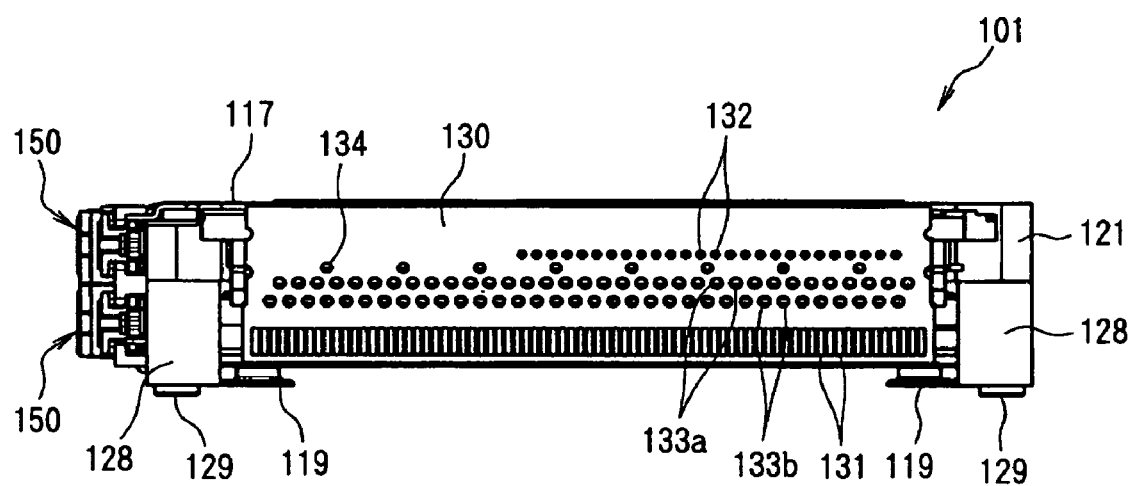
FIG. 11 is a back view of the card connector assembly shown in FIG. 7.
Figure 12A:
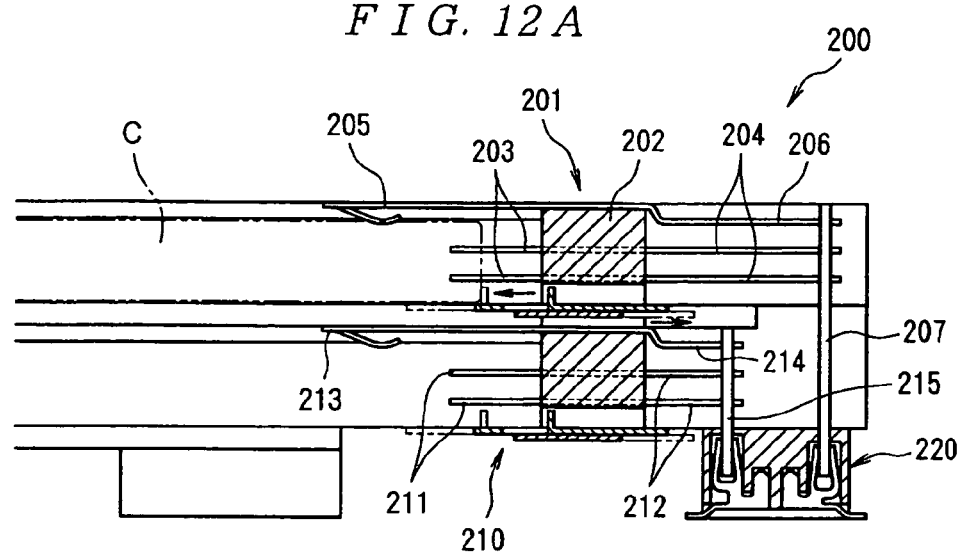
FIGS. 12A and 12B show sectional views of conventional examples of card connector assemblies.
Figure 12B:
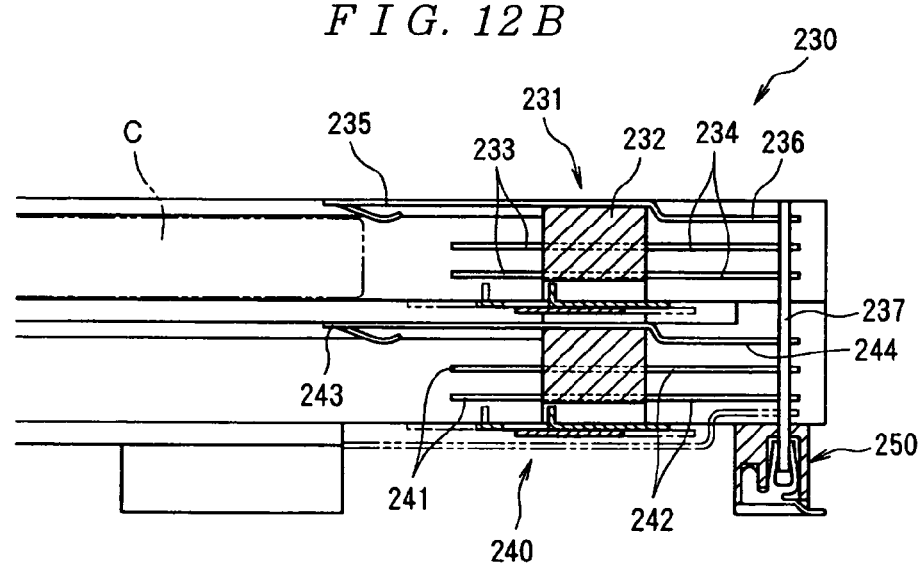
Figure 13:
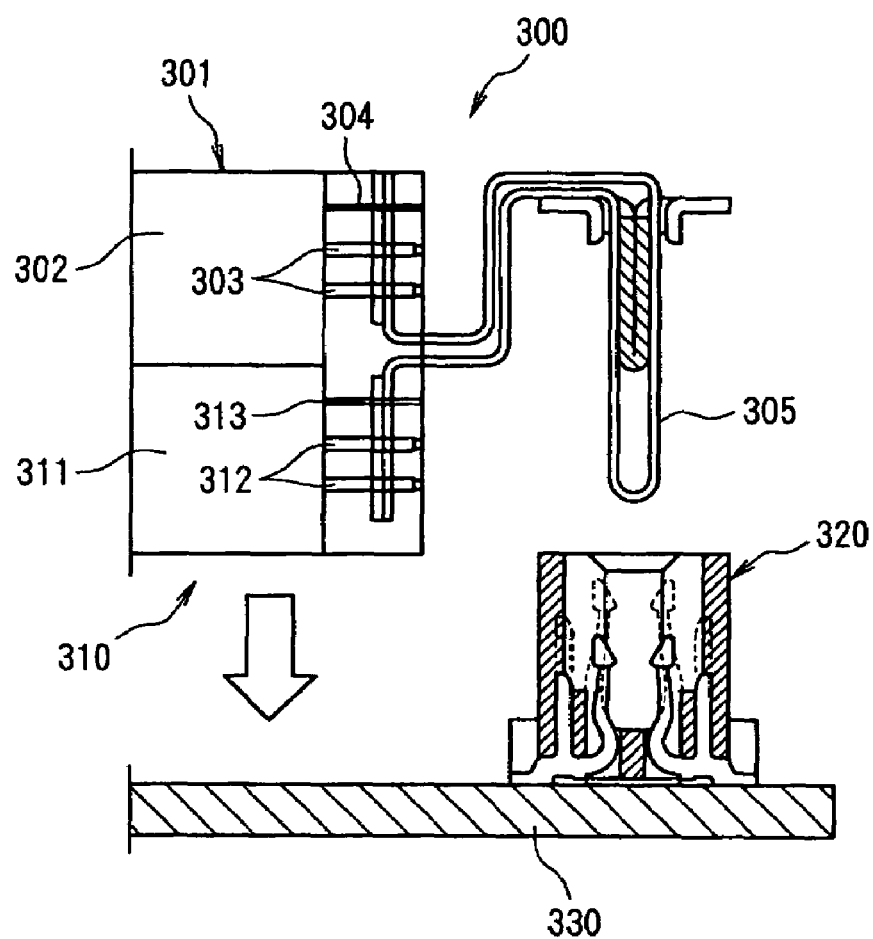
FIG. 13 is a sectional view of another conventional example of a card connector assembly.

The transmission path A for connecting the first card connector 110 to the circuit board PCB comprises a first rigid board 113 to which the respective first contacts 112 of the first card connector 110 are connected on one end of the top surface, a relay connector 114 that is connected to the other end of the top surface of the first rigid board 113, and a second rigid board 130 that is connected to the relay connector 114. The first rigid board 113 extends forward from the first housing 111, pass through a through-hole 121a formed in the second housing 121, and extends to the vicinity of the second rigid board 130. A plurality of signal conductive patterns to which the first contacts 112 are connected are formed on the top surface of the first rigid board 113. The relay connector 114 comprises a relay housing 115 which extends in the direction of width (in the left-right direction in FIG. 7) and is placed on the first rigid board 113, and a plurality of relay contacts 116 having a substantial L shape which are press-fitted to the relay housing 115 in a single row along the direction of width of the relay housing 115, and which are connected to the respective signal conductive patterns on the first rigid board 113. The respective relay contacts 116 have feet 116a which are thicker than terminal parts 123a and 123b that extend from the second contacts 122a and 122b of the upper and lower rows of the second card connector 120. The feet 116a are disposed in a single row along the direction of width of the second rigid board 130, and are respectively connected by soldering to through-holes 132 that are disposed in a single row along the direction of width of the second rigid board 130 as shown in FIG. 11. Signal conductive patterns (not shown in the figures) are formed on the inner surface (left surface in FIG. 10) of the second rigid board 130, so that the feet 116a of the relay contacts 116 and these signal conductive patterns are electrically connected to each other when the feet 116a of the relay contacts 116 are connected to the through-holes 132.

Furthermore, the transmission path B for connecting the second card connector 120 to the circuit board PCB comprises a plurality of terminal parts 123a that extend to the front of the second housing 121 from the respective second contacts 122a of the upper row, a plurality of terminal parts 123b that extend to the front of the second housing 121 from the respective second contacts 122b of the lower row, a plurality of connection parts 125 that extend to the front of the second housing 121 from the ground plate 124, and the second rigid board 130 to which the respective terminal parts 123a and 123b and connection parts 125 are connected. Here, the respective terminal parts 123a and 123b are arranged in two rows (upper and lower rows) along the direction of width of the second rigid board 130, and are respectively connected by soldering to through-holes 133a and 133b that are arranged in two rows (upper and lower rows) in an alternately staggered fashion along the direction of width of the second rigid board 130 as shown in FIG. 11. Moreover, a plurality of through-holes 134 to which the connection parts 125 of the ground plate 124 are connected by soldering are formed in the second rigid board 130. Furthermore, signal conductive patterns (not shown in the figures) that connect signal conductive pads 131 and the through-holes 133a and 133b, and ground conductive pattern (not shown in the figures) that connect ground conductive pads 131 and the through-holes 134, are formed on the outer surface of the second rigid board 130. When the terminal parts 123a and 123b are connected to the through-holes 133a and 133b, the terminal parts 123a and 123b and these signal conductive patterns are electrically connected to each other. Furthermore, when the connection parts 125 of the ground plate 124 are connected to the through-holes 134, the connection parts 125 and this ground conductive patterns are electrically connected to each other.

Here, the transmission path A for the first card connector 110 and the transmission path B for the second card connector 120 are completed by inserting the terminal parts 123a and 123b that extend from the second card connector 120 into the through-holes 133a and 133b in the second rigid board 130 so that these terminal parts 123a and 123b are connected to the through-holes 133a and 133b while inserting the feet 116a of the relay contacts 116 that extend from the relay connector 114 into the through-holes 132 in the second rigid board 130 so that these feet 116a are connected to the through-holes 132. Accordingly, a card connector assembly 101 whose assembly work is favorable can be produced.

Furthermore, in the assembly of these transmission paths, since the feet 116a whose tip ends protrude further than the terminal parts 123a and 123b that extend from the second card connector 120 are first inserted into the through-holes 132 in the second rigid board 130, these feet 116a can be used as guide members when the terminal parts 123a and 123b are inserted into the second rigid board 130, so that a card connector assembly 101 whose assembly work is even more favorable can be produced.

Moreover, the second rigid board 130 mates with a relay connector 140 disposed on the circuit board PCB when the first card connector 110 and second card connector 120 are placed on the circuit board PCB. As a result, the first contacts 112 of the first card connector 110 and the circuit board PCB are electrically connected to each other, and the second contacts 122 and ground plate 124 of the second card connector 120 and the circuit board PCB are electrically connected to each other.

If a card that has a relatively high transmission speed is connected to the first card connector 110 in a state in which the first contacts 112 of the first card connector 110 and the circuit board PCB are electrically connected to each other, the signal terminals of the card are connected to the circuit board PCB via the first contacts 112, the pattern on the top surface of the first rigid board 113, the relay contacts 116 of the relay connector 114 that are lined up in a single row, the second rigid board 130, and the relay connector 140. Here, since the first contacts 112 are connected to the second rigid board 130 via the first rigid board 113, there is no need to use an expensive FPC, so that it is possible to produce an inexpensive card connector assembly 101 that can maintain transmission characteristics and that is therefore suitable for high-speed transmission.

Furthermore, when a card that has a relatively high transmission speed is connected to the first card connector 110, the ground part of the card is grounded to the circuit board PCB via the ground contact tongue parts 118 and metal brackets 119.

On the other hand, if a card that has a relatively low transmission speed is connected to the second card connector 120 in a state in which the second contacts 122 and ground plate 124 of the second card connector 120 and the circuit board PCB are electrically connected to each other, the signal terminals of the card are connected to the circuit board PCB via the second contacts 122a and 122b, the terminal parts 123a and 123b, the second rigid board 130, and the relay connector 140. In this case, furthermore, the signal ground part of the card is grounded to the circuit board PCB via the ground plate 124, the second rigid board 130, and the relay connector 140. Moreover, the frame ground part of the card is grounded to the circuit board PCB via the ground contact tongue parts 127 and metal brackets 119.

Embodiments of the present invention were described above. However, the present invention is not limited to these embodiments, and various alterations and modifications can be made.

For example, it would also be possible to form signal conductive traces that connect the signal conductive pads 31 to the through-holes 33a and 33b, and ground conductive traces that connect the ground conductive pads 31 to the through-holes 34, on the inner surface of the rigid board 30, and to form signal conductive traces that are connected to the feet 13a and 13b of the first terminal parts 13 on the outer surface of the rigid board 30.

Furthermore, it would also be possible to form signal conductive traces that connect the signal conductive pads 131 to the through-holes 133a and 133b, and ground conductive traces that connect the ground conductive pads 131 to the through-holes 134, on the inner surface of the second rigid board 130, and to form signal conductive traces that are connected to the relay contacts 116 on the outer surface of the second rigid board 130.

What is claimed is:

1. A card connector assembly comprising:
   stacked first and second card connectors for connection with two cards having mutually different transmission speeds, and mutually different electrical interfaces; and
   transmission paths for connecting the first and second card connectors to a circuit board on which these first and second card connectors are to be placed, wherein
   these transmission paths comprise a plurality of first and second terminal parts that respectively extend from the first and second card connectors, and a rigid board to which these first and second terminal parts are connected, and
   the first terminal parts which extend from the first card connector that is to be connected to a card having a relatively high transmission speed are such that a large portion of each adjacent first terminal part from the first card connector to the rigid board extends parallel in a single row.

2. The card connector assembly according to claim 1, wherein the first terminal parts are connected to the rigid board by surface-mounting.

3. The card connector assembly according to claim 1, wherein the first and second card connectors comprise separate housings.

4. The card connector assembly according to claim 3, wherein the separate housings are staggered in the forward-rearward direction.

5. The card connector assembly according to claim 3, wherein the first terminal parts extend through an opening in the housing of the second card connector.

6. A card connector assembly comprising:
   first and second card connectors that are stacked for the connection with two cards having mutually different transmission speeds, and mutually different electrical interfaces; and
   transmission paths for connecting the first and second card connectors to a circuit board on which these first and second card connectors are to be placed, wherein
   the transmission path for the first card connector that is to be connected to a card having a relatively high transmission speed comprises a first rigid board to one end of which the first card connector is connected, a relay connector that is connected to the other end of the first rigid board, and a second rigid board that is connected to the relay connector, and
   the transmission path for the second card connector that is to be connected to a card having a relatively low transmission speed comprises terminal parts that extend from the second card connector, and the second rigid board to which these terminal parts are connected.

7. The card connector assembly according to claim 3, wherein the relay connector comprises relay contacts which have feet whose tip ends protrude further than the terminal parts that extend from the second card connector, and these fret of the relay contacts are connected to the second rigid board.

* * * * *

UNITED STATES PATENT AND TRADEMARK OFFICE
CERTIFICATE OF CORRECTION

| | | |
|---|---|---|
| PATENT NO. | : 7,052,316 B2 | Page 1 of 1 |
| APPLICATION NO. | : 10/995969 | |
| DATED | : May 30, 2006 | |
| INVENTOR(S) | : Tanigawa et al. | |

It is certified that error appears in the above-identified patent and that said Letters Patent is hereby corrected as shown below:

In column 12, line 53, delete "fret" and insert --feet--.

Signed and Sealed this

Seventeenth Day of October, 2006

JON W. DUDAS
*Director of the United States Patent and Trademark Office*